(12) United States Patent
Gardner et al.

(10) Patent No.: US 6,861,012 B2
(45) Date of Patent: Mar. 1, 2005

(54) LATENT INKJET FORMULATION AND METHOD

(75) Inventors: Norman A. Gardner, Bala Cynwyd, PA (US); Terry Stovold, Saranac, NY (US)

(73) Assignee: Laser Lock Technologies, Inc., Bala Cynwyd, PA (US)

( * ) Notice: Subject to any disclaimer, the term of this patent is extended or adjusted under 35 U.S.C. 154(b) by 456 days.

(21) Appl. No.: 09/975,541

(22) Filed: Oct. 11, 2001

(65) Prior Publication Data

US 2002/0041372 A1 Apr. 11, 2002

Related U.S. Application Data

(63) Continuation-in-part of application No. 09/458,850, filed on Dec. 10, 1999, now Pat. No. 6,483,576.

(51) Int. Cl.$^7$ .............................................. B41M 3/14
(52) U.S. Cl. ........................ 252/301.36; 252/301.35; 106/31.14; 106/31.15; 106/31.64; 427/7; 357/71
(58) Field of Search .......................... 427/7; 106/31.14, 106/31.15, 31.32, 31.64; 252/301.36, 301.34, 301.35, 301.16, 301.4 R, 301.4 S, 301.4 P, 301.4 H, 301.4 F, 301.5, 301.6 R, 301.6 S, 301.6 P, 301.6 F; 357/71

(56) References Cited

U.S. PATENT DOCUMENTS

| | | | |
|---|---|---|---|
| 3,881,941 A | * | 5/1975 | Kernohan ................ 250/462.1 |
| 4,387,112 A | | 6/1983 | Blach |
| 5,093,147 A | | 3/1992 | Andrus et al. |
| 5,212,558 A | | 5/1993 | Obata et al. |
| 5,289,547 A | | 2/1994 | Ligas et al. |
| 5,342,672 A | | 8/1994 | Killey |
| 5,395,432 A | | 3/1995 | Nelson et al. |
| 5,541,633 A | | 7/1996 | Winnik et al. |
| 5,542,971 A | * | 8/1996 | Auslander et al. ....... 106/31.15 |
| 5,554,842 A | * | 9/1996 | Connell et al. .............. 235/491 |
| 5,574,790 A | | 11/1996 | Liang et al. |
| 5,592,561 A | | 1/1997 | Moore |
| 5,736,233 A | | 4/1998 | Fye |
| 5,837,042 A | * | 11/1998 | Lent et al. ................ 106/31.14 |
| 5,925,593 A | | 7/1999 | Salgado et al. |
| 5,935,308 A | | 8/1999 | Siddiqui et al. |
| 5,939,468 A | | 8/1999 | Siddiqui |
| 5,974,150 A | | 10/1999 | Kaish et al. |
| 6,114,018 A | | 9/2000 | Phillips et al. |
| 6,176,908 B1 | | 1/2001 | Bauer et al. |
| 6,183,548 B1 | | 2/2001 | Erdtmann et al. |
| 6,193,792 B1 | | 2/2001 | Fague |
| 6,214,100 B1 | | 4/2001 | Parazak et al. |
| 6,221,142 B1 | | 4/2001 | Wang et al. |
| 6,402,986 B1 | * | 6/2002 | Jones et al. ............ 252/301.16 |

FOREIGN PATENT DOCUMENTS

| | | |
|---|---|---|
| DE | 198 03 997 | 8/1999 |
| EP | 0 595 583 | 10/1993 |
| FR | 2 739 324 | 4/1997 |
| WO | WO 98/22291 | 5/1998 |
| WO | WO 98/40223 | 9/1998 |

* cited by examiner

Primary Examiner—C. Melissa Koslow
(74) Attorney, Agent, or Firm—Duane Morris LLP

(57) ABSTRACT

A latent or "invisible ink" security marking formulation is provided using a phosphor with distinct emissions characteristics including visible emission due to excitation at a particular invisible wavelength. An insoluble inorganic phosphor with this or a similarly distinct emission characteristic is milled to a small particle size, preferably less than one micron particle diameter, and is combined with a carrier at very low pigment concentration, for example one percent by weight of the ink formulation. Preferably the pigment is cropped to resin particles in a binder. This ink formulation is diluted by a volatile solvent and applied using a conventional inkjet printer of the type used to mark codes on packages and labels. To test for security purposes the printing is irradiated and a response according to the predetermined characteristic is noted (or not noted) to detect security information. The marking is not immediately apparent and without knowledge of the specific phosphor used is difficult for a counterfeiter to reproduce.

8 Claims, 2 Drawing Sheets

LATENT INKJET FORMULATION AND METHOD

CROSS REFERENCE TO RELATED APPLICATION

This is a continuation-in-part of U.S. patent application Ser. No. 09/458,850, filed Dec. 10, 1999, now U.S. Pat. No. 6,483,576.

BACKGROUND OF THE INVENTION

1. Field of the Invention

The invention relates to latent inks and coatings intended to be substantially undetectable except under specific activation conditions that may be kept confidential or if known are not easily arranged. When used to apply foreground text or symbols to a background, such inks and coatings sometimes are termed "invisible ink" indicia. The ink or coating alternatively can be used as a distinct detectable background feature.

The invention provides a latent ink formulation for inkjet printing and coating applications, comprising insoluble phosphor pigment particles that emit light by phosphorescence resulting from excitation, wherein emission is at a different wavelength than excitation. In the preferred formulation, a pigment is used that has two distinct phosphorescent response wavelengths in response to illumination at two different excitation wavelengths. Preferably, the response wavelengths are within the visible spectrum and the excitation wavelengths are not.

The inkjet formulation of the invention is readily produced and provides a robust phosphorescent response to excitation while being substantially indistinguishable from an uncoated substrate (i.e., invisible) in the absence of excitation

2. Prior Art

U.S. Pat. No. 5,592,561—Moore discloses an authenticating, tracking/anti-diversion, and anti-counterfeiting system that can track various goods. The system includes a control computer, a host computer, a marking system, and a field reader system, which can be physically linked via data transmission links. An identifiable and unique mark is placed on each good, or on materials out of which the goods are to be made, which enables subsequent inspection. The marks or patterns include areas where a marking agent is applied in an encrypted pattern and areas where it is not applied. The pattern can be scanned or captured by a reader and deciphered into encoded data. The entry can then either be compared directly to a set of authentic entries on a database or decoded and compared to a set of data on the centrally located host database. The marking system provides control over imprinting, allowing a limited number of authorized codes to be printed before re-authorization is required. Monitoring of the marked goods is facilitated by including a unique encrypted pattern having, for example, a unique owner identifier, a unique manufacturer identifier, a unique plant identifier, a unique destination identifier, and time and date information.

U.S. Pat. No. 5,574,790—Liang et al. discloses a multiple-reader system for authentication of articles based on multiple sensed fluorescent discriminating variables, such as wavelengths, amplitudes, and time delays relative to a modulated illuminating light. The fluorescent indicia incorporates spatial distributions such as bar codes as discriminating features, to define a user-determined and programmable encryption of the articles' authentic identity.

U.S. Pat. No. 5,289,547—Ligas et al. discloses a method for authenticating articles including incorporating into a carrier composition a mixture of at least two photochromic compounds that have different absorption maxima in the activated state and other different properties to form the authenticating display data on the article, subjecting the display data to various steps of the authenticating method, activating all photochromic compounds, preferential bleaching of less than all of the photochromic compounds, and/or bleaching of all the photochromic compounds, and subsequent examination of the display data following the various activation and bleaching steps by verifying means to enable authentication.

U.S. Pat. No. 5,974,150—Kaish et al. discloses an anti-counterfeiting system wherein an authentication certificate affixed to a product is impregnated with dichroic fibers containing a fluorescent dye. Dichroic polymer fibers may also form part of the product to be authenticated. In order to determine if the imprinted code corresponds to the certificate itself, the fiber pattern, which is completely random, is illuminated by a light and read by a scanner. The resulting pattern is then compared to the encoded pattern to determine authenticity.

U.S. Pat. No. 5,212,558—Obata et al. discloses an encoding system wherein a confidential image is recorded on a substrate using invisible ink. The invisible ink emits visible light having a wavelength of about 360–380 $\eta$m when irradiated with light having a wavelength of 250 $\eta$m. Unfortunately, such a system is easily compromised by viewing the invisible ink with a black light, which is readily available to the public.

Similarly, U.S. Pat. No. 5,939,468—Siddiqui discloses jet ink compositions suitable for producing marks on objects that are invisible to the unaided eye and are visible only when excited by exciting radiation in the preferred wavelength region of from about 275 $\eta$m to about 400 $\eta$m.

U.S. Pat. No. 5,093,147—Andrus et al. discloses a method for providing intelligible marks that are virtually invisible to the unaided eye on the surface of an article. The invention is based on a jet ink containing an organic laser dye that is poorly absorptive in the visible range of about 400 to 700 $\eta$m, is absorptive of radiation in the near infrared range of at least 750 $\eta$m, and fluoresces in response to radiation excitation in the infrared range at a wavelength longer than that of the exciting radiation. Thus, the marks remain invisible to the naked eye after excitation.

Additional related disclosures of fluorescing pigments for normally invisible or latent markings are found in EPO 595,583—Canon KK, PCT/US98/04672 (WO 98/40223)—Polaroid Corp., PCT/US97/20342—Eastman Chem. Co., DE 198 03 997—Kaule et al., and FR 2,739,324—Schiffmann et al. Examples of phosphors for authentication purposes having different excitation and emissions wavelengths are disclosed, for example, in U.S. Pat. No. 4,387,112—Blach.

U.S. Pat. No. 5,935,308—Siddiqui et al. and U.S. Pat. No. 5,395,432—Nelson et al. disclose a latent image printing process involving activation prior to detection of the latent image. A latent image is applied to a substrate using an ink composition containing zinc chloride or zinc bromide. These references apply the normally-invisible (latent) image to a substrate using an ink jet printing technique. The latent image is activated by application of a fluid activator that reacts with the applied image and renders the printing permanently visible thereafter. Activation techniques of this type may be useful in some instances but they can be checked for security purposes only once, namely activated and viewed, whereupon the image is no longer latent and the security aspect is lost or very much reduced. The marking is not as useful as a mark that remains latent between detection steps or returns to its latent state after activation. The permanently visible activated marking in the Siddiqui and Nelston technique may tend to devalue some types of marked substrate due to the permanent activated mark. As another aspect of these prior art references, which could be viewed either as a security drawback or a saving grace, the latent image can be removed using a solvent or diluted to the point of erasing the image, because zinc chloride and zinc bromide have high solubility in many common solvents.

All the foregoing references are hereby incorporated for their teachings of phosphors and coatings for authentication uses. According to the present invention, certain insoluble phosphors are employed in an optimal ink formulation for inkjet applications.

SUMMARY OF THE INVENTION

Latent image printing for security purposes has certain objectives that run counter those of normal printing, while in other respects the objectives are similar. For normal printing, it is usually desirable to make printed images highly visible. Ink formulations are sought that are brightly hued, clear, sharply edged and contrasted with the background, apparent under various lighting conditions, frequently opaque so as to completely occlude the background, etc. The ink might be applied in shades, but even so, the ink is applied to be readily seen. The foreground images applied are clearly distinct from places that are blank (or have a different background color or shade of coating), which is necessary to form figures or to contribute to a larger image that will be seen.

Security ink and latent printing indicia also need to be visible, but only under certain activation conditions. Under activation conditions it is also advantageous for the latent printing to appear bright and to have good contrast against other areas. However, in the absence of the predetermined activation conditions, the security ink needs to be undetectable. The added requirement of being undetectable results in constraints on the formulation of latent inks, and to some extent limits the extent to which the latent ink can serve its purpose of being readily visible under activation conditions.

It might be advantageous to choose a latent ink formulation having the same color as the background in the absence of activation, which may limit the choice of background colors. The latent ink can be neutral as to coloring when not activated, i.e., substantially transparent, but this is normally not possible if the pigment comprises insoluble phosphor particles. The latent ink can be applied so thinly that the dominant appearance is the background, but this tends to limit the amplitude of the phosphorescent response to activation.

The appearance of the pigment fraction carrying the activatable material is one concern, and the appearance of any additives that are entrained with the pigment fraction is another concern. Typically, inkjet formulations are applied with a volatile carrier that evaporates away immediately after application. A soluble pigment might bond well to the substrate, particularly if the substrate is porous, and insoluble pigments are generally left at the surface after the volatile carrier evaporates. To improve the durability of the printed coating, insoluble pigments can be applied with a binder that adheres respectively to the substrate and to the insoluble pigment particles. In a latent ink, that binder must be substantially invisible, as must any other components used in the ink, such as curing and thixotropic agents, drying control agents to reduce skin formation, agents to affect viscosity or electrical conductivity, pH and anti-oxidation agents, and so forth. All these agents must be invisible or applied so thinly as to be practically invisible, which is a formidable challenge.

For the latent coating to be undetectable apart from activation conditions, any detectable reflectance characteristics such as gloss or matte surface appearance must be matched to the background and surrounding areas, if possible. The background could be separately printed with a composition containing all the same ingredients except the pigment. Whether the background is printed or not, the printing must have no apparent thickness that would render edges visible.

Efforts to make the color agent and the carrier (et al.) invisible generally work against the need to make the agent appear consistently bright and visible when activated. For example, in security applications it is advantageous to make the latent ink or coating difficult or impossible to remove or alter (e.g., to abrade or wash away, to smudge, or to eradicate or deactivate by chemical or other means). These objectives generally require binders and the binder is prone to affect the appearance of the coated areas in a way that is distinct from the background uncoated areas.

There are reasons for latent marking of items such as goods in commerce, in a manner that is difficult to detect and/or reproduce. Marking authentic goods facilitates the identification of counterfeits, which lack the predetermined marking. Some marking techniques are intended to identify the source of authentic goods, for example to bear a hidden serial number or production lot identity, shipment lot identity, manufacturing location or the like, for tracing purposes.

There art two general categories of ink formulations, namely dye inks and pigment inks. Hybrids are possible as well. Pigment inks typically comprise opaque finely divided particles as the color-carrying element that is applied to the printed material, whereas dye inks have a dissolved liquid colorant. Dye inks are generally more brightly colored than pigment inks. However pigment inks usually produce a more durable coating on the printed material.

In a pigment ink, the particles carrying the color are discrete typically opaque particles. The particles are suspended in a liquid carrier in which the colorant pigment material is not soluble. The liquid carrier is volatile, however, and typically comprises a solvent nonetheless. The volatile carrier evaporates after printing, leaving the pigment particles coating the article. This is distinct from dye inks in which the colorant is dissolved in a solvent carrier and may penetrate or chemically interact with the material of the printed medium.

The particular pigment type can be arranged to phosphoresce at an optically detectable wavelength, when excited with electromagnetic energy at a different optical wavelength.

BRIEF DESCRIPTION OF THE DRAWINGS

Certain exemplary embodiments and techniques are shown in the drawings. These embodiments are intended to illustrate aspects of the invention but are not intended to represent all possible ways that the invention might be embodied. Reference should be made to the appended claims for a definition of the scope of the invention in which exclusive rights are claimed.

DETAILED DESCRIPTION OF PREFERRED EMBODIMENTS

Figure 1:
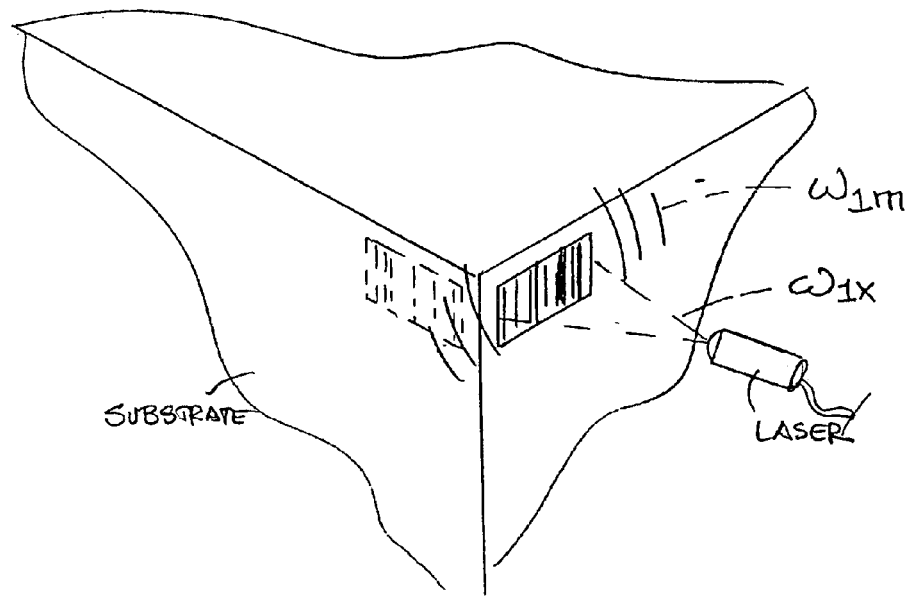
FIG. 1 is a partial perspective view illustrating light excitation to reveal security printing on a substrate such as a container for a product.

Some types of colorants are only practical as pigments. According to the present invention, for example, a colorant for security applications is provided in the form of an ink for inkjet printers. The ink advantageously comprises a certain type of phosphor that is aptly embodied as an opaque particle. According to the preferred embodiment of the present invention, a phosphor pigment is employed that has two distinct and non-overlapping excitation-and-response characteristics. The phosphor pigment of the invention is responsive to two different excitation wavelengths, both of which are outside of the visible spectrum. In response to such excitation at either (or both) of two excitation wavelengths, the inventive pigment phosphoresces at two distinct phosphorescent response wavelengths. In the preferred embodiment, both are in the visible spectrum at different wavelengths or colors.

By making the authentication code latent and/or difficult to stumble upon or to fully understand, security is improved. In the case of a latent authentication code, the counterfeiter may fail to attempt to duplicate a code that is not known or understood, or may decide to attempt to pass the articles to persons who will not go to the effort to check for a subtle code or marking.

An advantageous aspect of the phosphors is that the light radiation that is emitted in response to radiation can be very much distinct from the radiation that excites the phosphors to emit the radiation (i.e., to phosphoresce). Thus, for example, an electron beam may excite phosphors as in a cathode ray tube. A phosphor illuminated using light at one wavelength may be caused to phosphoresce at a wholly different wavelength. The wavelengths of the exciting and resulting emissions can be distinct not only because of their wavelength (whereby color filters may be useful in the authentication or reading equipment), but furthermore, only one of the two wavelengths could be in the visual spectrum, making it difficult to discern even that the authentication markings are present. The encoding can employ a combination of phosphors that are excited at different wavelengths, and that emit at different wavelengths (different from the excitation wavelengths and also different from one another). This provides a whole range of authentication possibilities that are used apart from or in combination with otherwise concealed, encoded or otherwise complicated authentication markings, such as spatial patterns of marks or colors.

There are a number of difficulties associated with using insoluble pigments, especially phosphor particles such as inorganic upconverting phosphorus pigment particles, in latent printing, especially for commercial inkjet application of the latent colorant. Among other things, an insoluble pigment particle is typically an opaque particle. It would be advantageous if opaque pigment particles could be made substantially invisible even though they are opaque, which suggests that the pigment particles be made very small and be applied very sparsely. On the other hand, it is desirable to apply sufficient pigment to obtain a vigorous phosphorescent response when the phosphor pigment is excited.

Unlike a liquid dye, ink comprising a quantity of insoluble pigment particles also must be processed so that the pigment particles have the necessary size characteristics so as to enable flow, preferably entrained with a carrier. However, smaller particles may not necessarily be better for latent printing. In low concentration, pigment particles that are too small and/or sparse may become substantially undetectable under activation conditions (i.e., the latent ink may be too diffuse and thus too dim).

In addition, inorganic insoluble phosphor pigment particles are typically abrasive. Extensive milling to reduce particle size may abrade the milling chamber and any abrasive milling bodies used, until the ink is rendered visible by the resulting addition of insoluble particles (metal or abrasives powders).

Liquid inks can sometimes penetrate a substrate such as paper or cardboard. Insoluble pigment particles simply rest on the surface. The particles need to remain exposed so their emitted light is not occluded. However, if the particles are easily wiped away or buffed or washed away with solvents or the like, the ink is less useful as a security marking.

It is possible to apply insoluble pigment particles in a binder that adheres to the particles and to the substrate. In that case both the pigment particles and the binder need to be chosen for substantial invisibility. The binder needs to be substantially transparent. The binder must conceal the pigment particles when not activated. At the same time, the binder must not occlude the pigment particles so that they receive any activating radiation and fully reveal their phosphorescence when activated. The binder also should have little or no effect on any gloss or similar characteristic of the substrate.

Such requirements of invisibility have been described with respect to the binder, and also apply to any other component material that might be added to affect other attributes, such as viscosity, curing and skin forming attributes and the like.

The maximum particle size must be small enough that the pigment particles and any liquid entraining the particles, can be jetted through a print head using the jet emission means employed. The orifice of an inkjet printer capable of moderately precise print resolution could be, for example, a one micron diameter opening. The particles obviously must be smaller than that, and preferably are quite a lot smaller such that plural particles are not likely to interfere in the print head orifice.

The pigment particle material has a typical density of about 7.5 $g/cm^3$. The particles are totally insoluble in commonly used inkjet liquid carrier vehicles, including methyl ethyl ketone (MEK), isopropyl alcohol (IPA), acetone (AC), denatured ethanol, methanol, water, etc. It is an object of the ink that the particles will adhere to a coat the printed medium, but adherence, skin forming and other aspects may cause problems in the printer itself (i.e., a tendency to clog). The combined aspects of the desired pigment particles, solvent or other liquid carrier and inkjet delivery apparatus together make it difficult or impossible to employ frequency shifting or "upconverting" phosphor particles as the pigment particles in a homogeneous well-suspended ink mixture of the required characteristics for printing (e.g., viscosity and other flow characteristics).

It would be advantageous to provide a latent ink formulation that is viable under all the foregoing criteria. Although it might seem that the best that might be expected is a series of tradeoffs, resulting in possibly limited pigment brightness and/or a visible difference between coated and uncoated areas, according to the invention the problems are overcome to the extent that a latent pigment is provided that is substantially invisible in the absence of activating conditions, including the binder used to adhere the pigment particles to the substrate, but provides a readily detectable response in the visible spectrum. Moreover, the specific pigment employed actually has two distinct responses in the visible spectrum (preferably green and yellow emissions, respectively) that are triggered in a wavelength shifting manner from excitation at two different wavelengths, both of which are outside of the visible spectrum.

It would further be advantageous to provide a latent ink formulation that is relatively easy to make and to apply, so as to minimize any special steps required of the user. It would be particularly advantageous to provide a technique for handling and processing an insoluble relatively abrasive phosphor material, for combining the phosphor material with a carrier, bonding agent and other component materials that are useful for printing inks, so a to optimize performance as a latent security ink.

Authenticating money and products is important in various contexts, not limited to detection of counterfeits. Concealed authentication markings are useful to track goods that are authorized. Authentication markings are useful to control apparatus such as compact disk memory readers and writers, so as to permit copying or playback or full operation of program material only if licensed for such use. Authentication markings could similarly be useful as a code carrying means associated with accounting for licensing fees, monitoring usage or the like.

Improved authentication may be useful for verifying the contents of shipping containers, verifying that goods are from an authorized source of goods (whether or not they are counterfeit), etc. Counterfeit products may contain unauthorized copies of a product, its packaging, labeling or its logo(s), or any combination thereof. Attractive targets for counterfeiters are items with significant brand equity or symbolic value, where the cost of production is below the market value. In the situation of so-called gray market goods, "counterfeit" goods could actually be authentic goods but have been acquired below a particular market value and are shipped and/or sold to an unauthorized market value where they are sold in competition with authorized goods.

An unscrupulous party might attempt to fake an authentication marking such as a serial number, an origin indication code or the like. Attempts to fake authentic markings may succeed if it is difficult to detect a faked marking on the level of inspection used. The authentication code marking might be more or less complex. The extent to which the code marking is examined, tested or verified by use of communications or reference to stored information might be greater or less. One option is to conceal all or part of an authentication marking so that a party who is unaware of the marking cannot attempt to duplicate it.

An authentication marking can be "concealed" by various techniques that range widely in their sophistication and in the ease with which the ostensibly concealed markings are detectable. Minimal concealment may be sufficient to prevent an unscrupulous party from faking some markings but greater efforts could be needed if a large value is at stake. There is a competition between those who seek to design authentication markings that are difficult to detect and/or difficult or expensive to duplicate, versus those who seek to duplicate the markings sufficiently to pass some level of inspection from inspection by a casual observer to a detailed analysis requiring special equipment.

In the commercial manufacturing world, it is not uncommon for counterfeit or otherwise unauthorized goods to be manufactured, distributed, and sold in direct competition with authentic goods. Counterfeit articles can so closely resemble genuine goods that consumers readily confuse the counterfeit articles with the authentic articles. In other circumstances, the manufacturer segments the world market for different sales and distribution practices, so that the "counterfeit" goods may be essentially identical to authorized goods. Further, in many instances, a manufacturer produces goods under license from an intellectual property owner, and thus sales outside the terms of the license agreement are also "counterfeit."

Thus, there remains a need for a system and method for controlling, enabling, and directing marking of goods during the manufacturing process and enabling detection/cross-validation of the marks so that the goods are uniquely identified and tracked throughout the stream of commerce. In addition, there remains a need for a method and system for marking such that the markings are not readily reproducible and detectable with commonly available devices and so that the markings contain sufficient information for product authentication, identification, and tracking. There also remains a need for a system that can be readily altered periodically to hinder counterfeiting.

Figure 2:
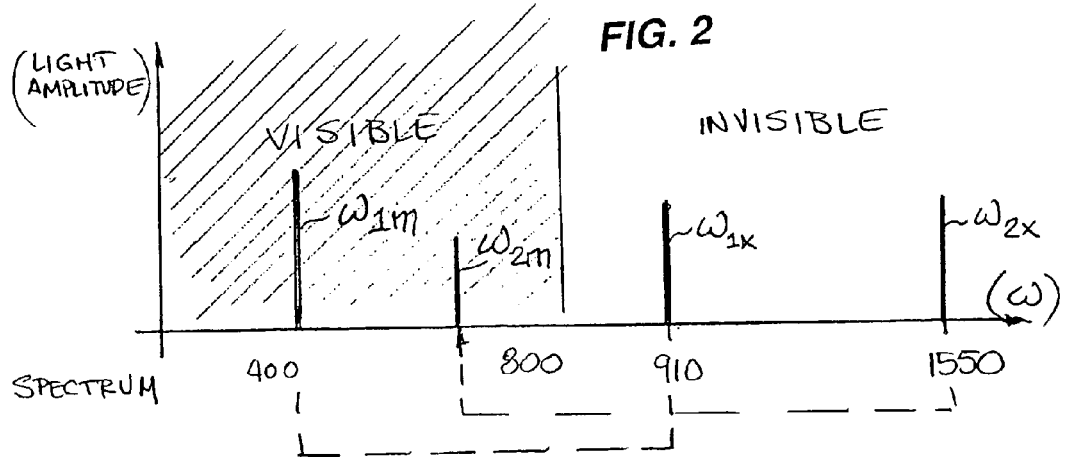
FIG. 2 is a spectral diagram illustrating the two-excitation two-response spectral relationship according to a preferred phosphor pigment.
Figure 3:
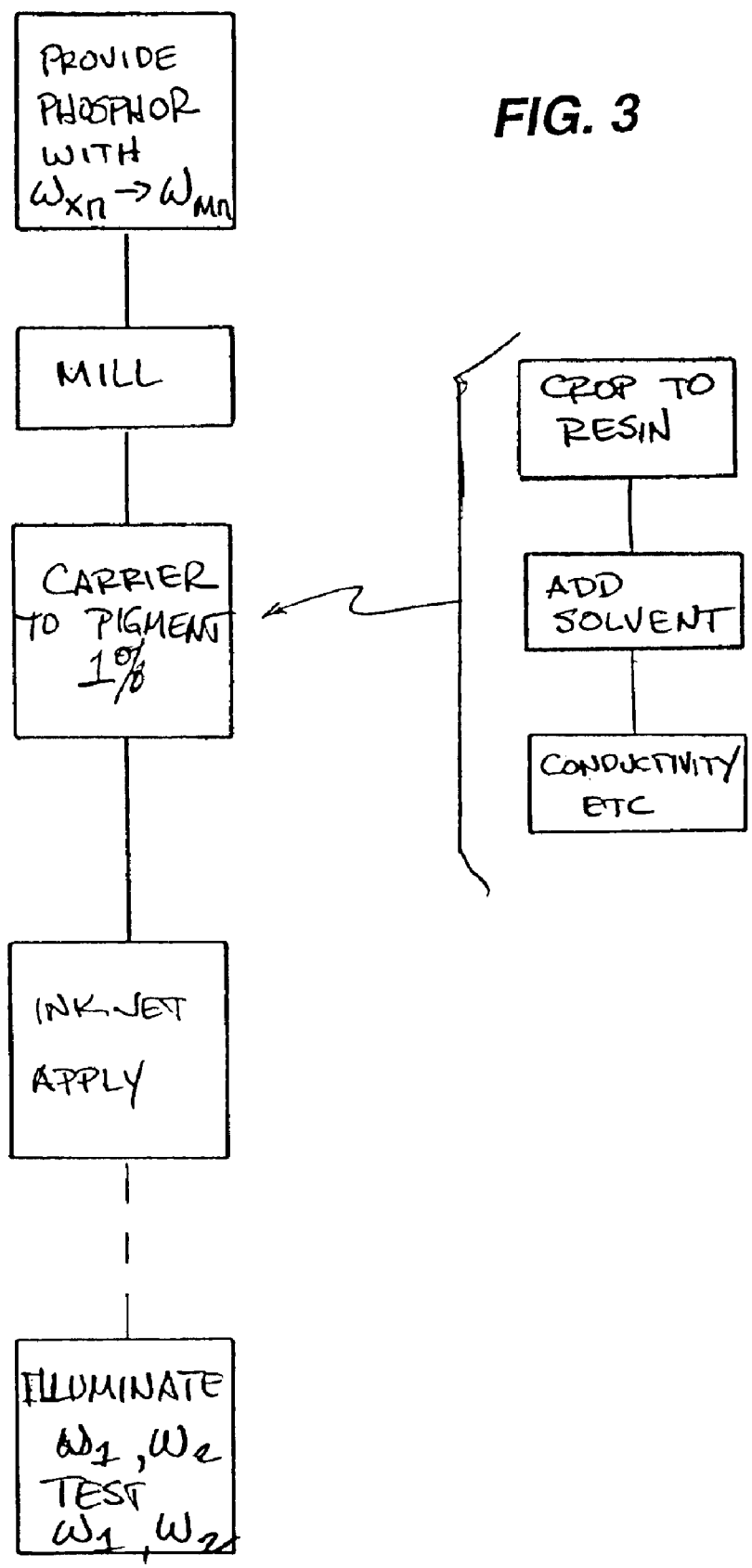
FIG. 3 is an abbreviated flowchart showing the steps involved in preparation and use of the pigment.

The invention provides a method for associating source information with a substrate, shown generally in FIG. 1. The method, shown generally in FIG. 3, comprises providing at least one latent marking agent that emits by phosphorescence detectable light at one or more specific wavelengths in response to being irradiated with light at one or more different wavelengths. The spectral relationship of a preferred phosphor is shown in FIG. 2, wherein there are two distinct excitation wavelengths $\omega_{1X}$ and $\omega_{2X}$ that are respectively associated with obtaining a responsive emission from the phosphor at two distinct emission wavelengths $\omega_{1M}$ and $\omega_{2M}$. According to an inventive aspect, these wavelength cause/effect relationships, namely between wavelengths $\omega_{1X}$ and $\omega_{1M}$ and also between wavelengths $\omega_{2X}$ and $\omega_{2M}$, provide multiple ways to determine whether or not a product presented and/or its security marking is authentic.

The matching or correspondence of the specific excitation and emission wavelengths is an at least partly unique characteristic of an insoluble phosphorescent pigment employed. This is accomplished in an ink containing the phosphor and potentially other pigments, dyes and/or phosphors. According to a further inventive aspect, this phosphor is applied so thinly that it is invisible in the absence of the required excitation conditions (i.e. irradiation with the required excitation wavelength to elicit phosphorescence at the expected response wavelength).

For any given marking or printing job using the latent marking agent (or latent or "invisible" ink), the specific phosphor or set of phosphors is known to the printer and is preferably kept confidential, as is the specific pattern of indicia that is printed using the phosphor or phosphor latent ink. There are a variety of possible combinations of phosphors, a variety of different excitation/emission relationships selectable by choice of phosphors, and a variety of combinations of foreground and background colors, code shapes, choices of code printing positions and the like, which together form a complex code known to the printer or authorized source and not to potential counterfeiters or unauthorized distributors.

A large number of combinations of phosphors and marking patterns are possible, and among those combinations, any number can represent confidential coded information. Such aspects can involve, for example, information content, size, placement on an article or in a printed patter, layering over and/or various other techniques.

It may be possible with sufficient resources and some trial and error to reverse engineer the marking on a given product and to determine, for example, the particular phosphor used or the particular protocol in which the content, placement or other features are to be found. However at least certain of the features are normally latent or hidden. Preferably the specific patterns or protocols are frequently changed. Preferably the access to specifications as to the actual latent markings used is restricted. Therefore, even if it would be possible with sufficient effort to reverse engineer the markings for a given job, the effort would not be justified in comparison to the value of the product or the importance of a particular channel of unauthorized distribution.

Embodiments of the invention are particularly suitable for marking goods during the manufacturing process and enabling detection/cross-validation of the marks so that the goods are uniquely identified and tracked throughout the stream of commerce. The markings, which preferably contain source information sufficient to enable product authentication, identification, and tracking, are not readily reproducible and/or detectable with commonly available devices.

Although the invention is particularly suitable for marking products and/or product containers, the invention is suitable for marking information on any substrate that would benefit from having such information encoded thereon in a latent format. Thus, the invention is also suitable for marking substrates such as, e.g., collectibles, money, legal documents, tickets, credit cards, etc. Non-limiting examples of materials from which suitable substrates can be made include paper, wood, synthetic polymers and metals.

The substrate is marked with a latent marking agent. The expression "latent marking agent" denotes a material that emits a detectable signal only after being activated. The expression "latent marking agent" encompasses invisible inks and pigments. It is particularly preferred that the latent marking agent be activated by electromagnetic radiation (EMR), preferably narrow bandwidth EMR (defined herein as EMR not more than 10 ηm in width), more preferably EMR having a bandwidth of 5 ηm or less, even more preferably single wavelength EMR. In embodiments, the activation or excitation wavelength is preferably at least 900 ηm. In embodiments, the activation or excitation wavelength is 915 ηm to about 990 ηm and/or 1550 ηm to 1800 ηm.

The EMR is preferably provided by a laser. In embodiments, the laser is a component of a detection apparatus dedicated to the task of screening substrates for latent marks of the invention. The apparatus can include features and components generally known to those of ordinary skill in the art. See, for example, U.S. Pat. No. 4,540,595. Thus, the system can include a transport means for transporting the items to a reading means having a source of radiation at the appropriate wavelength and intensity. The reading means includes a photodetector to read the fluorescent emission. If necessary, the system can include optical filters to eliminate or minimize undesired radiation, and any pattern recognition circuitry appropriate to the particular code patterns recorded.

Non-limiting examples of materials suitable for use as latent marking agents include rare earth metals, such as, e.g., europium, dysprosium, samarium or terbium, combined with a chelating agent, such as, e.g., an organic ligand, to form a biketonate, acetonate or salicylate. Additional examples include yttria phosphors, inorganic phosphors, Ciba Geigy Cartax CXDP and UV visible Eccowhite series from Eastern Color and Chemical. The marking agent preferably comprises an inorganic pigment, and in certain embodiments, the marking agent is free of organic dyes. The selection of the marking agent is largely dictated by the desired excitation wavelength and emission wavelength. In certain embodiments, it is preferred that the excitation wavelength be longer than the emission wavelength.

The method for affixing the marking agent to the substrate is not particularly limited. The term "affix" as used herein is intended to denote a durable (but not necessarily permanent or unremovable) association between the marking agent and the substrate. Preferably, the association between the marking agent and the substrate is sufficiently durable to remain functionally intact throughout the stream of commerce. The marking agent can be affixed to the substrate directly (e.g., via adsorption and/or absorption) or indirectly (e.g., via an adhesive).

The marking agent is preferably provided in a marking composition. Marking compositions generally comprise a marking agent and a solvent, with the marking agent provided at a concentration of about 2 to about 10 grams/liter of solvent, depending upon the marking agent used. Preferred solvents include methyl-ethyl ketone, ethanol and isopropanol. A solvent soluble resin, such as a Lawter resin, can be used if the marking agent is smaller than two microns to avoid precipitation of the marking agent from solution.

The marking compositions can further comprise additives, stabilizers, and other conventional ingredients of inks, toners and the like. In embodiments, various varnishes or additives, such as polyvinyl alcohol, Airvol 203 and/or MM14 (Air Products and Chemicals, Inc., Allentown, Pa.), propylene carbonate, Joncry wax varnishes, and Arcar overprint varnishes, can be added to the marking composition to reduce absorption into the substrate and ensure that the marking agent remains on the surface of the substrate.

Suitable marking means include, e.g., printers, including inkjet, flexographic, gravure and offset printers, pens, stamps, and coaters.

In a particularly preferred embodiment, the marking agent is luminescent pigment Z, K, S, ZH and/or GE (available from Stardust Material, New York, N.Y.), which is dispersed in an aqueous or organic varnish at a 2% to 5% ratio and applied to a substrate via printing or coating. This mark visibly fluoresces when exposed to a specific infrared light range. The illuminated color can vary depending upon the type of pigment utilized.

The illuminated color can also vary when used in conjunction with a colored plastic film or a translucent colored coating or varnish. The colored translucent layer can be printed or laminated on top or under the marking agent. The amounts of possible illuminating colors are virtually endless due to the numerous different translucent colored layers available.

When used in conjunction with the translucent colored layer, one specific marking agent can give virtually endless different illuminating colors, when excited by the appropriate EMR.

In embodiments, a first latent marking agent is adapted to emit a first signal at a first emission wavelength after being irradiated with infrared radiation at a first excitation wavelength, and a second latent marking agent is adapted to emit a second signal at a second emission wavelength after being irradiated with infrared radiation. The infrared radiation which excites the second latent marking agent to fluoresce can be the same as or different from the infrared radiation which excites the first latent marking agent. In either case, the first emission wavelength and the second emission wavelength differ, preferably by at least 5 nm, more preferably by at least 50 nm. These embodiments are useful, e.g., to provide multiple or redundant levels of protection or authentication, wherein authorized users having low-level clearance can detect only the first signal and are not informed of the second signal, whereas users having a higher level clearance are aware of, and can verify the presence of the second signal. Such a system guards against security breaches from within an organization.

The signal emitted by the latent marking agent is preferably a fluorescent emission. In certain embodiments, the emission wavelength is about 915 nm to about 1800 nm. In certain embodiments, the signal is a fluorescent emission at a visible wavelength.

Thus, products can be authenticated through the stream of commerce by irradiating any marking agent affixed to the product with EMR of a predetermined excitation wavelength and monitoring a predetermined emission wavelength for a signal confirming the presence of the latent marking agent on the substrate.

In embodiments, the monitoring is accomplished by a detector exclusively tuned to the emission wavelength. The expression "exclusively tuned" indicates that the detector detects only a narrow band of wavelengths within ±5 nm of the emission wavelength.

In certain embodiments, the latent marking agent must be exposed to ultraviolet radiation before it can emit the signal in response to being irradiated with infrared radiation. These embodiments can be useful for a variety of purposes, including demonstrating that a document has been photocopied, since photocopiers expose originals to ultraviolet radiation.

A product package can be marked with a first marking agent designed to emit fluorescent radiation at a first emission wavelength detected by the detector specifically focused on the first emission wavelength.

After a period of time, counterfeiters may figure out how to duplicate the authentication certificate, making it advisable to alter the authentication protocol periodically or after there is a suspicion that the certificate has been compromised. The instant invention provides for such a strategy. For example, the exciting radiation generating means can be replaced or tuned to another wavelength and a different marking agent can be used to provide a signal differing from the compromised signal. If the original marking agent is used along with the updated marking agent, counterfeiters who have compromised the original signal may not realize until it is too late that the original signal has been replaced by an updated signal.

The invention will be illustrated in more detail with reference to the following Examples, but it should be understood that the present invention is not deemed to be limited thereto.

EXAMPLE 1

Inkjet Ink

An inventive process and the resulting inkjet ink have been found particularly effective, and appropriately resolve difficulties associated with small pigment particle sizes and high pigment material density to be suspended in an inkjet-capable liquid mixture. In producing the inkjet ink, an inorganic pigment (specifically a phosphorous pigment compound for use as a security ink) was milled and filtered to reduce its particle size to a maximum size of less than one micron, particularly below 0.8 microns. This milled material was then fixed to cellulose resin particles by a crushing technique, which yielded an inkjet ink that had good flow, adhesion and appearance aspects and did not need frequent agitation to prevent settling.

In the premix and preparation stage, an inorganic phosphorous pigment was provided, having a particle size up to 10 microns. The process is applicable to phosphor pigments having various optical properties. According to the particular application an authentication ink, it was desirable to obtain an ink useful to provide a concealed marking or other concealed indicia such as a background shade or color. More particularly, a marking was provided that is detectable in particular circumstances but is not visible in usual ambient light and does not reflect any light at the same wavelengths at which it is illuminated. A Stokes type phosphor was employed as described in U.S. Pat. No. 4,387,112—Blach. Such a phosphor has the property that it is excited by light energy at one wavelength and phosphoresces at a different wavelength in releasing the excitation energy. This has the beneficial characteristic in connection with authentication that, if one tries to detect an authentication marking by illuminating the phosphor in the visible, ultraviolet or infrared spectrum and looks for reflections or emissions in the same spectrum, no such reflections or emissions will be found and the phosphor will go undetected. Excitation and emission are both in narrow bands. Two or more of these phosphors can be employed to further complicate the authentication code.

A particulate phosphor was provided and processed to obtain a small particle size relative to the one micron orifice of an inkjet printer, for use as a pigment in an inkjet ink. The particulate phosphor was mixed in air with an isopropyl alcohol solvent, using a proportion of 23% by weight solid pigment particles and 77% by weight solvent, or approximately one part to three parts by weight. The mixture had a "premix" viscosity of about 20 cps.

The pigment/solvent mixture was then milled to reduce the particle size and screened to remove all particles of sufficient size to present a danger of clogging the print head orifices. Milling was don with a Netzsch Labstar Zeta Lab Mill. A special silicon chamber was applied to the lab mill to minimize contamination.

The pigment ink produced by milling the phosphors was useful for inkjet printing for a time before settling and agglomeration became a problem. Agitating or shaking of the ink mixture resolved the pigment suspension problem. However, it was considered substantially impractical to provide agitation devices such as impellers, vibrators, pumps or the like, to resolve problems with the various models of printers that might employ the pigment ink, most of which have enclosed ink reservoirs and some of which have relatively compact ink supply arrangements.

An alternative to agitation was discovered in which the particles of insoluble pigment were "cropped" to a resin in order to make a finished inkjet ink wherein the pigment particles would not readily settle and/or agglomerate. Pigment particles on the order of 6 to 10 microns diameter were cropped to a cellulose resin with zirconium media in methyl ethyl ketone solvent (MEK) to produce a viscous pigment slurry. The cropping process is essentially a mechanical crushing of the pigment together with the resin in a solvent and media mixture. The resulting viscous pigment slurry mixture, after the media is removed, contains: pigment (LLZ upconverting phosphor)—about 20% by weight; resin (Ethyl Cellulose)—about 20% by weight, and solvent (MEK)—about 60% by weight. The thick resin/pigment mixture in MEK solvent was reduced in viscosity further, filtered and used as the colorant in an ink that could advantageously be applied with an inkjet printer, namely by combination into a mixture containing:

| | | |
|---|---|---|
| Denatured Ethanol | 91.1% | (by weight) |
| Lithium Nitrate (conductive agent) | 0.6% | — |
| Styrene Acrylic (binder) | 3.0% | |
| Viscous pigment LLZ slurry* (namely Ethyl Cellulose 20%, pigment LLZ (upconverting phosphor) 20% and Methyl Ethyl Ketone 60%, in each case by wgt.) | 5.0% | |
| Surfactant | 0.3% | |
| Total | 100% | |

Advantagesous results were achieved, with this formula wherein it can be seen that the concentration of LLZ upconverting phosphor pigment in the final ink formula was only one percent (i.e., 20%×5%), by weight. This concentration is advantageous in that the relatively low concentration leaves an ink coating that is not easy to detect, but is sufficient to produce a robust phosphorescent response when illuminated with laser light at the required excitation wavelength.

The prepared ink jet ink formulation was left stationary to test for settling of the pigment. A very small amount of settling was noticed after five days and did not progress substantially until the ink formulation was tested by a printing run at approximately ten days old, using a commercial inkjet printer. After about five minutes of printing using the ink, the printing operation produced a coating that was not detectable to the naked eye an uncoated white substrate. The pigment concentration (approximately one percent by weight as applied) was sufficient to produce a bright phosphorescent spot when illuminated using a low power laser diode handheld pointer operable at the excitation wavelength of the pigment phosphor.

It should be noted that different binders (resin) and solvents were used in the cropping process and in the final formula ink composition. It was determined that Ethyl Cellulose and MEK were optimal cropping components, as described above. On the other hand Styrene Acrylic, which is not suitable for cropping with the pigment, was found to have excellent properties in this latent security ink application, having particularly favorable invisibility and pigment-to-substrate achorage properties. Ethanol was preferred as the solvent for ink jet applications due to physical properties apt for this particular form of printing.

The following example demonstrated the milling steps and preparation procedures undertaken for processing an inkjet ink according to the invention, useful for security applications requiring a normally invisible ink that is readily detectable under wavelength specific illumination.

EXAMPLE 2

Inkjet Ink

The product to be processed was intended for inkjet printer application and to function as a security ink, namely to record a latent image that is invisible on normal inspection. For use with inkjet printing equipment, a benchmark requirement was a pigment particle size of less than 1.0 microns, to accommodate continuous droplet or on-demand droplet inkjet printing.

The ink was prepared in two main steps, namely preparation of the pigment particles and formulation of the inkjet ink comprising the pigment particles in a suitable carrier. Processing was begun by providing an inorganic insoluble pigment partcical mixture in an isopropyl alcohol (IPA) solvent. The pre-processing viscosity was 20 centepoise (cps). The mean particle size was 10 microns. With simple agitation in air, a mixture was obtained having 23% by weight solids (substantially all particles of inorganic pigment as described above, and 77% by weight IPA as the solvent.

The 10 micron particle size pigment and solvent mixture was milled, holding an upper temperature limit of 60 degree Celsius, to obtain a particle size wherein substantially 100% of the particles were less than 0.8 microns diameter. A Horiba LA900 unit was used to quantify the particle size distribution.

Milling was accomplished using a Netzsch Labstar mill in the Zeta or peg-agitation circulation milling mode. The mill volume was 0.55 liters and the grinding media size employed was 0.2 mm diameter. The Labstar was set up with the silicon carbide Zeta system and charged to 90% by volume with 0.2 mm Yttrium Stabilized Zirconium Oxide (YTZP) grinding media. A peristaltic pump was used to circulate the slurry through the mill during grinding. Particle size declined rapidly. After 20 minutes of circulation milling, the particle size distribution was 90% less than or equal to 0.8 microns.

In the second phase the formulation was adjusted for inkjet application. Initially, the milled slurry was filtered (strained) to remove impurities and particles too large to pass easily through an inkjet print head. The filtered slurry pigment mixture, containing approximately one fourth solid particles (by weight) and three fourths alcohol formed only 4.0% by weight in the final ink formulation. The slurry was also combined with 0.6% by weight lithium nitrate as a conductive agent, 0.9% by weight Ethocel 200 (an organic binder, available from Dow Chemical), and a carrier of 94.5% by weight EtOH CD 19 MIBK/HEPTANE. The correct 4.0% by weight proportion of pigment required addition of IPA to the slurry as described, to make up the correct percentage by weight.

As described, the insoluble pigment particles comprised only about 1% of the inkjet ink formulation, by weight. The remainder of the ink was substantially all the EtOH CD 19 MIBK/HEPTANE carrier, which is substantially transparent and colorless. It will be appreciated that this low percentage of solid pigment particles provided an ink that seemed to be substantially clear.

According to the preferred examples discussed, the pigment portion of the inkjet formulation was only one percent by weight when applied. This low percentage of pigment is apt for use as a security ink wherein there is little if any background or concurrently applied color that might help to conceal the security coating applied using the ink. In a typical application the security ink is unobtrusively applied to a carton or label component (or directly to a product) in a manner in which the ink is substantially invisible when applied, but due to application with a binder and/or solvent carrier tends to bond to the printed substrate. In a particularly demanding application, such as application to a glossy substrate, the proportion of pigment can be reduced below one percent. In a typical application to packaging that is white or off-white or tan, a one percent pigment formulation is preferred. In a printing situation in which color or coating thickness or character tend to conceal the a coating, such as a relatively thick translucent coated material with a matte surface, the proportion of pigment can be increased above the preferred 1%, for example to 5% or more, without loss of beneficial latency aspects.

The conductivity and viscosity of the inkjet formulation were within permissible ranges. The formulation was applied to a white paper substrate using an Imaje Series 4 printer, a printer conventionally used for applying code information to packaging (e.g., barcode). The printer employs an ink circulation pump, providing agitation.

The ink was applied (jetted) onto a white paper substrate. In the absence of viewing equipment, the applied pigment was not visible, and after a short drying period the printed areas could not be distinguished from unprinted areas in normal illumination (including sunlight). The printed substrate is taken into a darkroom and illuminated with a laser having the excitation spectrum needed to excite the particular phosphors in the pigment, whereup the printed area of the jetted ink became brightly visible (light green) and readily distinguishable from the unprinted area.

The formulation as described is very apt for use as security ink. Its formulation is conveniently possible with generally available materials processing equipment. Care should be taken, however, to maintain the purity of the formulation. Inasmuch as the security pigment comprises a very small percentage of the ink formulation, opaque contaminants such as metal abraded from the milling chamber during particle size reduction steps should be avoided or minimized. This can be accomplished by thorough cleaning of the equipment after each use.

Additionally, agitation is important to consider for ensuring that sufficient pigment is applied to obtain a robust response when attempting to excite a response from the phosphors. The ink produces a latent (invisible) image under normal application procedures, and thus it is difficult to monitor the printing operation as it is carried on. A laser illumination device can be provided in association with the printer, for example to provided a scanning raster pattern, for enabling monitoring of the printing operation.

EXAMPLE 3

Inkjet Ink from Reduced Particle Size Starting Pigment

For pigments that can be obtained with a relatively small particle size, it is possible to reduce the time required for cropping the pigment particles to resin particles. This also reduces the extent to which milling introduces unwanted potentially-visible opacity or color. Any added foreign particles may not only be visible as a faint grayness or dirty aspect, but also may tend to occlude the emission of light from excited pigment particles during read operations. Therefore if the ink formulation can employ very pure pigment particles, and if the purity can be maintained notwithstanding processing steps, then the resulting latent ink is improved both as to invisibility when latent and visibility when excited.

In high concentrations, pure pigment particles of the type described are advantageously light in color and typically may have a neutral light tan earth tone. At the low concentration of application discussed above, the pigment is substantially invisible. It is possible to increase the concentration of pigment and to improve the excitation response without adversely affecting latent invisibility, if foreign material contamination is reduced or eliminated.

Contamination problems increase as the pigment particles are made smaller. However smaller pigment particles are generally less prone to settle or to clog the inkjet printer parts. In the foregoing examples, a starting phosphor particle size of 6 to 10 $\mu$m was successfully employed and the particles were milled to size for application using standard inkjet printing equipment and with acceptable results. By way of comparison, and to decrease potential contamination, according to the present example, substantially pure phosphor particles were obtained with a mean particle size of 2.3 $\mu$m, and the particle size was reduced further during processing.

Contamination of the pigment may occur due to opaque particles that are polished from the surfaces of a milling chamber or other container due to abrasion with the pigment particles. Metal powder particles or the like form a dirty coating occluding the phosphor particles after the latent ink is applied. In order to reduce the occlusion of the pigment particles, the 2.3 $\mu$m mean particle size phosphor particles were cropped to a resin binder in a silicon-treated metal chamber. It is also possible to reduce the discoloration associated with polishing and metal particle contamination by using other chamber lining materials such as white porcelain when the latent ink is to be applied to a white paper or paperboard substrate.

EXAMPLE 4

Flexographic/Gravure Ink

The preferred inkjet compositions as described above have relatively low viscosity, and can employ solvents that may be inconsistent with some printing processes. However the invention is also applicable to other ink formulations. In this example, a formulation is disclosed that is suitable for flexographic and rotogravure printing techniques.

A quantity of Stardust Materials Product Z (CAS 68585-88-6) is dispersed at a weight ratio of 2% to 5% in a solution of Polyvinyl Alcohol, water and 0.5% to 2% Surfynol 104PG surfactant using standard mixing equipment. This mixture is passed through a wet micronizer to reduce the pigment size to between 3 microns to 8 microns. Then wetting agents, dispersing agents and non-latent color dyes or pigments (omit if colorless is desired) are added to the mixture.

Viscosity can be adjusted either by increasing water content or adding a viscous PVA MM14 additive. The specific viscosity can be brought to within the range recommended for the printing technique to be used. When the mixture has the appropriate viscosity and suspension of solids, the ink can be printed using standard flexographic/gravure press techniques to print the ink, for example on a white or clear substrate such as paper or film via the flexographic/gravure printing press.

To the naked eye, the printed ink appears no different from any other ink, or in the case of a clear latent ink, the printed ink is not detectable at all. In ordinary light, such as daylight, sunlight and ultraviolet or blacklight illumination, the phosphor emissions are either absent or have such a small amplitude compared to reflection of the illuminating radiation, that there is nothing about the appearance of the ink to distinguish it from any other ink or similar visible color.

However, the printed ink fluoresces at certain specific wavelengths, when excited by radiation at certain other specific wavelengths. This characteristic provides a meaningful basis for authentication or for conveying confidential information by marking and detection of markings made with concealed (latent) security ink.

There is a shift in wavelength between the operative excitation wavelength and the resulting emission wavelength. When the printed ink is excited at 930 ηm, which specific wavelength can be delivered by a tuned laser apparatus, a noticeable color will fluoresce at a different wavelength. According to the example of Stardust Materials Product Z (CAS 68585-88-6), the operative excitation wavelength 930 ηm produces a bright glowing green fluorescence in the visible spectrum. When the laser excitation is removed, the ink promptly appears as before, namely without fluorescence.

If no visibly colored dye or pigment is added to the ink apart from the fluorescent inorganic pigment, the color switches on and off between a bright glowing green and the background color. The background color can be used in addition to the fluorescent color to provide combinations that are employed as security codes. For example, according to the example in which the fluorescent color is green, a non-latent red dye or pigment can be added. In that case the unexcited color is red and the excited color is white or light colored (red plus green). If the background non-latent color is dark or white, the excited color switches on (green) and off, rather than changing colors as a function of the excitation and resulting fluorescence.

Certain phosphors suitable as inorganic latent pigments, such as Stardust Materials Product Z (CAS 68585-88-6), discussed above, have more than one mode of excitation and response. Thus, for this particular pigment, the 930 ηm excitation bandwidth produces a bright green fluorescent emission. This same phosphor ink can be excited at 1550 ηm, namely a wholly different wavelength, which produces fluorescence at a different wavelength in response. Specifically, the excitation at 1550 ηm applied to Stardust Materials Product Z (CAS 68585-88-6) produces a second response that in the absence of other modifying pigment or dye colors will fluoresce a yellow color. Both these excitation wavelengths are outside the visible spectrum and both produce different and distinct wavelength responses in the visible spectrum. By testing a printed ink for the combination of both these responses, and optionally also testing for the absence of responses to excitation at other wavelengths, it is possible to conveniently verify the presence of the specific security ink formulation employing that pigment product.

Accordingly, an aspect of the invention is the provision of a latent ink having a security response that is testable in at least two ways and potentially any number of ways, involving different excitation wavelengths to evoke a fluorescent response at wavelengths that are (1) different from the excitation wavelength, and (2) different from one another.

In this manner, latent ink is provided that is subject to variations by choice of the specific multi-response phosphor pigment. The latent ink is difficult for a counterfeiter to reproduce. Initially the ink is latent (invisible) so that it is not readily apparent that any security code is in place. The security code may have one, two or more excitation/fluorescence responses, and only extensive testing of marked indicia may reveal the specific response. The response can be modified in any number of ways that might represent a code (e.g., combinations of characters or shapes or foreground/background arrangements or colors). The marked product can be marked irregularly, such as via sampling of a subset of product, or in a limited area or a relatively inaccessible location, or otherwise can be altered to reduce the likelihood that the marking will be found by a counterfeiter or fully understood even if one aspect of the marking may be discovered.

The invention having been disclosed in connection with particular embodiments, variations in accordance with the inventive concepts should now be apparent, but which differ from the specific embodiments disclosed as examples. The invention is intended to encompass such variations with in the range permitted by law, and reference should be made to the appended claims rather than the foregoing discussion of examples, to assess the scope of the invention in which exclusive rights are claimed.

We claim:

1. A latent security marking formulation, comprising:
   a phosphor pigment having at least two distinct emission wavelength characteristics and particles cropped to particles of a resin binder, wherein at least one of said emission wavelength characteristics comprises fluorescent emission of light at a visible wavelength in response to excitation by irradiation of the pigment at an invisible wavelength, and wherein the phosphor pigment is provided with a particle size smaller than a predetermined maximum size for inkjet printing; and
   a volatile vehicle for carrying the pigment, wherein the formulation comprises 1% to 5% by weight of the pigment,
   wherein the pigment has distinct fluorescent responses at least at two excitation wavelengths, said distinct responses including different emission spectra responsive to said two excitation wavelengths.

2. The formulation of claim 1, wherein the formulation comprises 1% by weight of the pigment.

3. The formulation of claim 1, wherein the pigment comprises an insoluble inorganic material having a particle size of less than one micron diameter.

4. A method for applying a security marking, comprising the steps of:
   providing a phosphor pigment having an emission characteristic comprising fluorescent emission of light at a predetermined visible wavelength in response to excitation by irradiation of the pigment at a predetermined invisible wavelength, and wherein the phosphor pigment is provided with a particle size smaller than a predetermined maximum size for inkjet printing;
   milling the phosphor pigment to a particle size suitable for inkjet printing; combining the phosphor pigment with at least one of a solvent carrier, a resin subject to solution in the solvent and a conductive agent to provide a latent ink;
   printing a substrate with the ink, by use of an inkjet printer, thereby marking the substrate with a latent marking that is normally inactive and is revealed by said excitation; and
   cropping the pigment particles after milling, particles of a resin binder,
   wherein the pigment has distinct fluorescent responses at least at two excitation wavelengths, said distinct responses including different emission spectra responsive to said two excitation wavelengths.

5. The method of claim 4, wherein the ink is provided with a concentration of the pigment of about 1%–5%, whereby the ink is normally invisible after printing and is rendered visible by application of said irradiation at the predetermined invisible wavelength.

6. The methode of claim 5, wherein the ink is provided with a concentration of the pigment of about 1%, whereby the ink is normally invisible when applied to an otherwise uncoated surface of the substrate.

7. The method of claim 4, wherein the particle size has a maximum of about one micron mean diameter.

8. The method of claim 4, further comprising countering potential contamination of the pigment during said milling by at least one of cleaning to remove contamination of between milling operations, employing an abrasion resistant milling apparatus, and providing concurrent coloring agents comprising at least one visible dye or pigment arranged to conceal the contamination.

* * * * *